Patented Sept. 7, 1948

2,448,703

UNITED STATES PATENT OFFICE 2,448,703

COPOLYMERS OF HALO ALLYL ESTERS OF CARBOXYLIC ACIDS

Albert M. Clifford, Stow, Ohio, assignor to Wingfoot Corporation, Akron, Ohio, a corporation of Delaware No Drawing. Application May 16, 1941,
Serial No. 393,777

1 Claim. (Cl. 260—93)

This invention relates to plastic masses containing polymerized 2-halo allyl esters and to interpolymers of these esters with other monomeric materials. More particularly, it relates to rubber-like polymers containing a 2-halo allyl ester.

It has been found that the 2-halo allyl esters, especially the 2-chloro allyl esters, of organic carboxylic acids may be polymerized to yield useful plastic masses. This is particularly true of interpolymers of the esters with other monomeric substances which may be generally included by the term mono-substituted ethylene compounds, the vinyl compounds within this class being especially satisfactory in the formation of compositions of rubber-like characteristics.

The esters which are contemplated include, among others, 2-chloro allyl acetate, 2-chloro allyl formate, 2-chloro allyl furoate, 2-chloro allyl benzoate, 2-chloro allyl crotonate, 2-chloro allyl 2-ethyl butyrate, 2-chloro allyl 2-ethyl hexoate, 2-chloro allyl maleate, 2-chloro allyl propionate, 2-chloro allyl levulinate, and 2-chloro allyl chloro acetate, as well as the corresponding 2-bromo allyl esters corresponding to each of the foregoing.

These esters may be polymerized alone or with each other or, preferably, with butadiene-1,3, isoprene, 2-3-dimethyl butadiene-1,3, and the like. The other monomer may be present in the ratio of 20–80% of the total monomers present but it is preferred to maintain a ratio in which at least 40% of the 2-halo allyl ester is present.

To illustrate the formation of plastic masses from various of these esters, they were interpolymerized with butadiene-1,3 in various proportions. The interpolymerization was carried out in an aqueous emulsion containing an emulsifying agent, such as Aquarex D, Duponol, or other sodium lauryl sulfate type emulsifier, although still other types of emulsifiers may also be employed. A buffer is added, such as a phosphate-citrate type buffer, and an oxidant and a catalyst preferably should also be present. The emulsion follows standard practice and need not be further described. The temperature of polymerization may range from 30–80° C. but is usually maintained in the neighborhood of 38–50° C. The time of polymerization will be that required to secure a latex of the desired yield and characteristics.

To illustrate the preparation of various copolymers, the following typical system is given. An emulsion was made up containing in water solution the following ingredients:

6% Duponol _____ cubic centimeters __ 10
Buffer solution ($Na_2HPO_4$+citric acid)
 _____ do ____ 10
$NaBO_3.4H_2O$ _____ do ____ 0.133
$CCl_4$ _____ grams __ 0.48
Butadiene and other monomer The 2-chloro allyl ester and the butadiene were added in various proportions and polymerization was conducted with the results noted below:

| Other Monomer | Ratio | pH | Time, Hours | Yield, Per cent |
|---|---|---|---|---|
| 2-chloroallyl- | | | | |
| acetate | 60/40 | 6.4 | 192 | 53.2 |
| Do | 60/40 | 7.2 | 192 | 60.8 |
| formate | 60/40 | 2.8 | 192 | 27.5 |
| Do | 60/40 | 3.4 | 192 | 40.6 |
| furoate | 60/40 | 5.9 | 192 | 66.7 |
| Do | 60/40 | 6.8 | 192 | 80.3 |
| benzoate | 60/40 | 5.5 | 384 | 71.3 |
| Do | 60/40 | 6.9 | 384 | 61.9 |
| crotonate | 60/40 | 6.8 | 258 | 77.2 |
| Do | 60/40 | 7.7 | 258 | 66.3 |
| 2-ethyl butyrate | 60/40 | 6.2 | 258 | 67.9 |
| Do | 60/40 | 6.8 | 258 | 70.6 |
| 2-ethyl hexoate | 60/40 | 5.9 | 258 | 60.4 |
| maleate | 60/40 | 6.3 | 235 | 78.0 |
| Do | 60/40 | 6.9 | 235 | 83.7 |
| Do | 80/20 | 7.1 | 115 | 56.2 |
| propionate | 60/40 | 7.3 | 190 | 59.0 |
| levulinate | 60/40 | 5.9 | 165 | 60.6 |
| Do | 60/40 | 6.5 | 165 | 64.2 |
| chloroacetate | 60/40 | 5.25 | 66 | 41.3 |

Copolymers were obtained in each instance, the properties of these varying from tough to soft. Similar results may be obtained by replacing the butadiene by one of the other monomers mentioned above.

While there have been described above the preferred embodiments of the invention, it will be apparent to those skilled in the art that various modifications and changes may be made therein without departing from the spirit of the invention or from the scope of the appended claim.

I claim:

A copolymer comprising 2-chloroallyl propionate interpolymerized with butadiene-1,3, each monomer being present in the ratio of about 20% to 80% of the total reacted monomers.

ALBERT M. CLIFFORD.

REFERENCES CITED

The following references are of record in the file of this patent:

UNITED STATES PATENTS

| Number | Name | Date |
|---|---|---|
| 2,127,660 | Coleman | Apr. 23, 1938 |
| 2,159,008 | Coleman | May 23, 1939 |
| 2,160,941 | Britton | June 6, 1939 |
| 2,205,390 | Britton | June 25, 1940 |
| 2,213,201 | Britton | Sept. 3, 1940 |
| 2,221,663 | Rothrock | Nov. 12, 1940 |
| 2,273,891 | Pollack | Feb. 24, 1942 |
| 2,282,088 | Pollack | May 5, 1942 |
| 2,310,731 | D'Alelio | Feb. 9, 1943 |
| 2,331,263 | Britton | Oct. 5, 1943 |